(12) United States Patent
Williams et al.

(10) Patent No.: US 8,922,818 B2
(45) Date of Patent: Dec. 30, 2014

(54) MOBILE PRINT EMAIL REPLY WITH THUMBNAILS

(71) Applicant: Electronics for Imaging, Inc., Foster City, CA (US)

(72) Inventors: Leon Williams, Walworth, NY (US); Patrick H. Wood, Lake Hopatcong, NJ (US); David May, San Leandro, CA (US)

(73) Assignee: Electronics for Imaging, Inc., Fremont, CA (US)

(*) Notice: Subject to any disclaimer, the term of this patent is extended or adjusted under 35 U.S.C. 154(b) by 0 days.

(21) Appl. No.: 13/851,025

(22) Filed: Mar. 26, 2013

(65) Prior Publication Data

US 2014/0293320 A1 Oct. 2, 2014

(51) Int. Cl.
*G06F 15/00* (2006.01)
*G06F 3/12* (2006.01)
*G06K 15/00* (2006.01)

(52) U.S. Cl.
CPC ............ *G06F 3/1292* (2013.01); *G06F 3/1268* (2013.01); *G06F 3/1276* (2013.01); *G06K 15/007* (2013.01)
USPC ....................................... 358/1.15

(58) Field of Classification Search
USPC ....................................... 358/1.15
See application file for complete search history.

(56) References Cited

U.S. PATENT DOCUMENTS

2010/0220358 A1* 9/2010 Beninato et al. ............. 358/1.15

* cited by examiner

*Primary Examiner* — Saeid Ebrahimi Dehkordy
(74) *Attorney, Agent, or Firm* — Michael A. Glenn; Perkins Coie LLP

(57) ABSTRACT

Techniques are provided that allow the user to view on his or her mobile device the body of an email or other items from a message service as well as each of the attachments as thumbnails or individual images. As well, techniques allow the user to view particular attributes of each item, e.g. the number of pages and the page size of a particular attachment. Techniques are provided such that the user may view such thumbnails and/or attributes on a unique URL generated as a result of the generated email. Thus, by such techniques, the user is provided with a platform for mobile devices that allows intuitive selection of what should be or is desired to be printed.

12 Claims, 3 Drawing Sheets

MOBILE PRINT EMAIL REPLY WITH THUMBNAILS

BACKGROUND OF THE INVENTION

1. Technical Field

This invention relates generally to the field of digital printing. More specifically, this invention relates to digital printing from mobile devices.

2. Description of the Related Art

More than ever, mobile users may need to print when they are on the road. An example of a current exemplary mobile print solution is EFI™ PrintMe® ("PrintMe"), a real-time cloud printing solution that allows users to print anywhere on Internet-enabled and/or telecommunications connected devices. How such cloud printing solution works is as follows. Users find a nearby printer. For example users may go a particular website, such as PrintMe.com, to view a list of nearby printers that have been configured for an automatic discovery service, such as AutoDiscovery by Microsoft® or Bonjour discovery by Apple. Users may then send their documents to the PrintMe service in several different ways:

- Upload the documents on the PrintMe.com web site.
- Send an e-mail message addressed to the PrintMe web site, e.g. print@printme.com, attaching the documents to be printed.
- Print directly from a Windows application on a computer with a PrintMe driver installed.
- Send documents from mobile devices to the PrintMe web site, e.g. print@printme.com.

In each case hereinabove, users receive an e-mail response from the PrintMe service. The e-mail message contains a document identification number (DocumentID). Users go to a PrintMe terminal and enter such DocumentID and their documents print. As well, users may print from their mobile devices configured with a PrintMe driver or any other printer configured with a PrintMe driver.

SUMMARY OF THE INVENTION

Techniques are provided that allow the user to view on his or her mobile device the body of an email or equivalent items from a message service and each of the attachments thereof as thumbnails or individual images. As well, an embodiment allows the user to view particular attributes of each item, e.g. the number of pages and the page size of a particular attachment. In an embodiment, the user may view such thumbnails and/or attributes on a unique URL generated as a result of the generated email or equivalent item from a message service. Thus, the user is provided with a platform for mobile devices that allows intuitive selection of what should be or is desired to be printed.

DETAILED DESCRIPTION OF THE INVENTION

Figure 1:
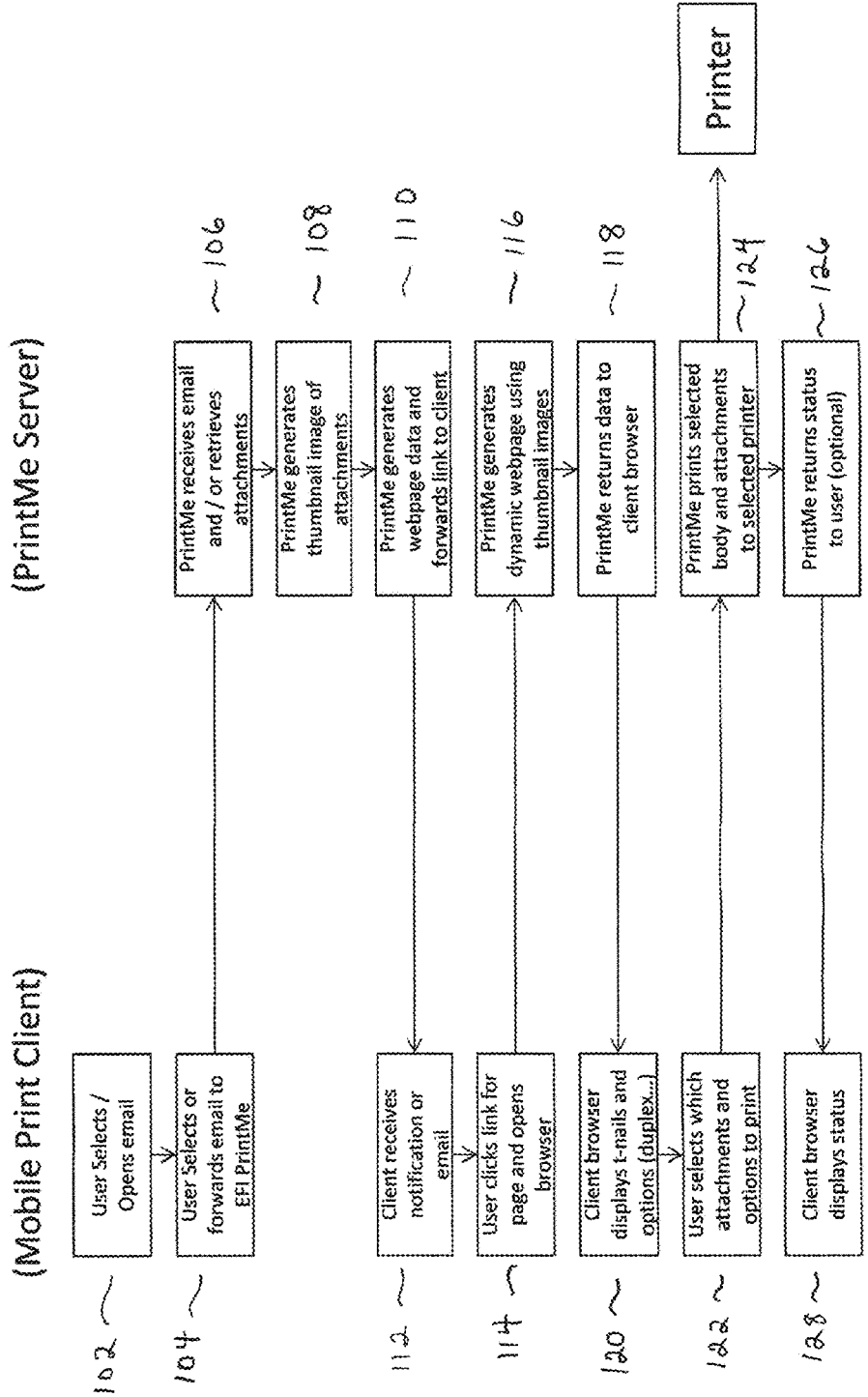
FIG. 1, a schematic diagram of a workflow for mobile print email reply with thumbnails, according to an embodiment.

Techniques are provided that allow the user to view on his or her mobile device the body of an email or equivalent items from a message service and each of the attachments thereof as thumbnails or individual images. As well, an embodiment allows the user to view particular attributes of each item, e.g. the number of pages and the page size of a particular attachment. In an embodiment, the user may view such thumbnails and/or attributes on a unique URL generated as a result of the generated email or equivalent item from a message service. Thus, the user is provided with a platform for mobile devices that allows intuitive selection of what should be or is desired to be printed.

It should be appreciated that while the businesses may have kept pace with customers' growing needs through providing Internet access and sophisticated business centers, there sometimes remains one source of frustration: printing. For example, whether to print an email body and/or particular attachments of the email may be problematic using state of the art mobile print-using-email solutions, because selecting whether the email body and/or which of the email attachments to print may be less than intuitive. Present solutions allow users to selectively print the email body, the email attachments or both based on a static server based configuration. For example, if there are two or more attached documents the filenames of which are not descriptive, the user may not know or be able to ascertain which of such documents he/she wants to print. Similarly, suppose an email is sent with multiple photos. Without current techniques that do not provide a visual clue of the content of the photos, the user as well as the printing operation is somewhat "blind" and, thus, cannot intelligently select which of the photos to print. A user may end up wasting time and other resources on the process of printing photos or documents, which had the user otherwise known the contents thereof the user would have decided not to print.

Thus, it would be advantageous to provide techniques for users to select whether to print the email body, particular attachments of the email, or equivalent items from a message service from their mobile devices.

It should be appreciated that while much of the discussion herein may refer to "emails," such reference is for illustrative purposes and is not meant to be limiting. An email is presently a familiar and recognizable digital message from a particular type of message service. However, it should be readily recognized that the fundamental concepts discussed herein may apply to items which are equivalent to or similar to emails and that may also arrive from a message service.

Embodiments herein are provided for when a mobile device user has an email that has multiple attachments. Examples of the attachments may be photographs, Microsoft® Word ("Word") documents, cross-platform documents, e.g. in .pdf format, spreadsheets, and the like. Embodiments herein allow the user to select which, if any, such attachments they would like to have printed. For example, perhaps the user wants only one attachment of a few to be printed. For another example, perhaps the user only wants the Word document to be printed and not the photographs and not the file in .pdf format. Embodiments herein are provided to respond to the original email, where the user has forwarded his or her mail to a print server along with another email which has a web link such as an http or https link. When the email with the web link returns to the user, the user may then click on that link, which causes a control page or a web page with selection options to display in the user's browser. Those selection options may include but are not limited to thumbnails of the documents, photographs, .pdfs, or any file in the attachment. In an embodiment, such selection options are configured to allow the user to select as though to say, "Yes, I want to print this attachment" as well as "No, I don't want to print this other attachment." Extending this core idea, embodiments allow users to add constraints or options to the printing of the selected attachments. For example, the user may make a selection that may indicate, "I want to print this document duplex" or "I want to print this document 2-up" or that may indicate other controls, including but not limited to standard controls in the printing environment. Thus, embodiments herein make it easier and convenient for the user to select that which they want to print and to obtain the desired result with a minimum of additional software required on the mobile device as well as with a minimum of resources used. It should be appreciated that in an embodiment, no applications for mobile devices are required, because the above-described results may be achieved by using web browser technology only.

It should be appreciated that in accordance with one or more embodiments herein, a print server may be but is not limited to any of:

Fiery® Digital Print Servers by Electronics For Imaging, Inc., Foster City, Calif.;

Centralized print servers, which for purposes of discussion herein are servers operating in back office mode and feeding few to many printers; or Servers capable or enabled to manage or process printing and which may be centralized or distributed. For purposes of discussion herein a centralized print server may be centralized for but is not limited to a local region, such as for example a building or a number of closely grouped buildings. It should be appreciated that more than one centralized print servers may coordinate printer addresses and so forth to form a printing infrastructure.

In an embodiment, at a high level, a user prints via device application print functions or forwards an email to a configured print server. The print server responds to the user with another email, which has a corresponding link in it. The user clicks on the link. In response to the link being clicked, the user is presented with a web page from the print server which allows the user to select different attachments and different printing options for those attachments. That is, the user may select to print only that which the user desires to print.

An embodiment may be understood by reference to FIG. 1, a schematic diagram of a workflow for mobile print email reply with thumbnails. A user selects and/or opens an email from a mobile client on his or her mobile device 102. The mobile client may be an email application resident on his or her mobile device, e.g. MobileMe by Apple Inc. or an email application resident on a cloud server, e.g. Yahoo! Mail by Yahoo! Inc.

The user, presumably desiring to print aspects of the email, forwards the email containing what is to be printed to a printing server containing a printing service or utility 104, e.g. a specified email address running such printing service. An example printing service is EFI™ PrintMe®. As another example, a user may use iOS printing by Apple Inc. and log into the service via Internet Printing Protocol (IPP) with appropriate email credentials and password.

The printing service receives the email and/or retrieves the attachments, e.g. from a cloud or server, thereto 106. It should be appreciated that in the case of some mobile devices, the attachments may not be stored on the device but rather kept in the cloud or server to save bandwidth of transmitting large attachments.

The printing service then disassembles the email into the body and each unique attachment. In an embodiment, the print service queries the mail server, e.g. via Internet message access protocol (IMAP) or other similar mail protocols, to determine whether the email has attachments, to enumerate the attachments, and optionally to download the attachments that match criteria set by the user or the print server administrator as described in detail below. The first (or more) pages of the downloaded attachments may be rasterized (RIPped) for display to the user for enabling or disabling printing, as well as selecting print options, such as but not limited to color, black and white, duplex, 2up, etc.

In an embodiment, the printing service renders, i.e. RIPs or rasterized, each of the items and generates a thumbnail for each of the items 108. It should be appreciated that a thumbnail of the email, itself, and/or just of the body of the email or each of the attachments, may be generated, as well. In an embodiment, when a file is rendered, a low resolution thumbnail may be generated by but not limited to sub-sampling a high resolution bitmap. Anti-aliasing techniques may also be used to improve legibility of the low resolution thumbnail.

Also in response to receiving the email and/or retrieving the attachments, the printing service dynamically generates an object that may be configured for selecting one or more attachments to items 108 and for selecting options associated with the one or more attachments. In an embodiment, in response to receiving the email and/or retrieving the attachments, the printing service dynamically generates webpage data 110 containing a link ("URL") to a webpage that is generated dynamically when linked thereto. An example of such webpage data may be HTML code that produces, for example, FIG. 2. After generating the webpage data, the printing service sends the webpage data with the link to the mobile client 110.

In an embodiment, the printing service generates webpage data 110 containing a link ("URL") to a second webpage that is generated when the email and/or attachments are rendered (RIPed) or at any later time prior to the user clicking the URL. The second webpage may be configured for selecting one or more attachments to items 108 and for selecting options associated with the one or more attachments. An example of such second webpage data may be HTML code that produces, for example, FIG. 2.

It should be appreciated that in an embodiment the object data, e.g. the second webpage data, may also be static, i.e. created prior to receiving any emails, and configured in such a way to allow displaying dynamic links to items 108.

It should be appreciated that in an embodiment the object data, e.g. the webpage data, are returned to the "from" address contained in the original email. However, other embodiments are contemplated in which for example but not limited to an Internet printing protocol (IPP) or secure login may be used to identify a return address.

In an embodiment, the mobile client receives a response email containing the object data. For example, the mobile client receives a response email containing the webpage data containing the link 112. In another embodiment, the user may receive a notification about the object data, e.g. the webpage data and/or the URL.

In an embodiment, upon receiving the response email containing the link, the user may click the link, the act of which opens up a browser at the mobile client 114.

Responsive to the user clicking the URL, the printing service generates a unique, dynamic object. For example, responsive to the user clicking the URL, the printing service generates a unique, dynamic webpage using the thumbnails for each item 116. It should be appreciated that the print server may also generate other relevant data such as thumbnail statistics and/or data relevant to the printing of the images, themselves. For example, such relevant data or statistics generated by the print server may include but are not limited to printing options, e.g. duplex, number of pages, media size, e.g. original and/or what would be used for printing, color, B/W, document metadata, e.g. author or secure, image metadata, e.g. exchangeable image file format (Exif) tags, Flash, face, GPS, and other job options.

After generating the unique dynamic object, e.g. webpage, the print server returns the corresponding data to the browser at the mobile client 118.

Upon receiving the data corresponding to the unique dynamic object or, in an embodiment, the webpage, the browser at the mobile client displays the thumbnails and, if available, any other relevant data 120.

At the browser, the user may select which attachments and/or options to print 122. It should be appreciated that the user may also select the body of the email, with or without selecting attachments, as well. Embodiments providing particular user interfaces are discussed in further detail hereinbelow. In this embodiment, each item may have an associated button to print this item as well as elements, such as checkboxes, for selecting possible statistics, e.g. number of pages, media size, e.g. original and/or what would be used for printing, color, black and white (B/W), and other job options. Each thumbnail may be a live hypertext link to a larger representation of the item, e.g. an image gallery with next/previous links. Or the unique dynamic webpage may comprise an html page with but not limited to multiple images of the thumbnails, printer options, images, charts, figures within documents, and so on.

Responsive to the user selecting the body and/or attachments and/or options to print, the print server prints the selected items by sending the appropriate data to a printer 124.

Optionally, the print server may generate and return the status of the user selecting which items to print to the mobile client 126. And, the client browser displays the status or otherwise indicates the status to the user 128.

In an embodiment, the object, for example the entire webpage, may be the body of the email returned from the print service if supported. Put another way, in an embodiment the text from the original email to be printed may be included as part of the dynamic object or webpage.

Figure 2:
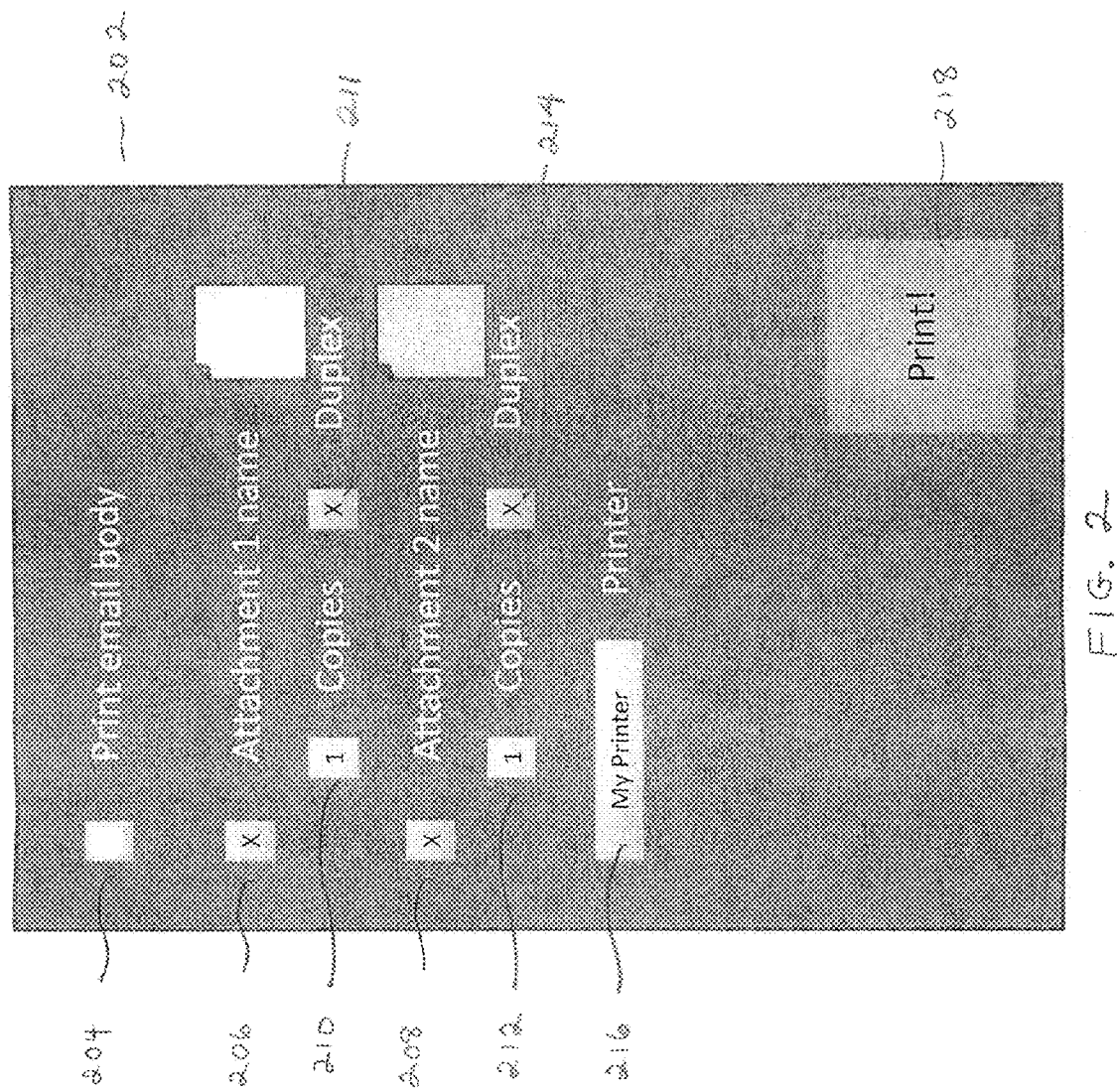
FIG. 2 is a schematic diagram of an example user interface, according to an embodiment.

An embodiment can be understood with reference to FIG. 2, a schematic diagram of an example user interface on the user's mobile device 202. User interface 202 shows three checkboxes for three items from the user's original email (not shown) that may be printable, checkboxes for associated printer options, an UI element for choosing a printer, and a button configured for sending the print job to the printer. It should be appreciated that such details as well as details provided hereinbelow are by way of example only and are not meant to be limiting.

A checkbox 204 is provided that is associated with the body of the original email. The user does not desire to print the body of the email, thus the checkbox is remains unchecked.

A checkbox 206 is provided that is associated with the first attachment of the original email. The user desires to print that attachment and has checked checkbox 206. A checkbox 210 is provided for the user to enter the number of copies desired to be printed for the first attachment. A checkbox 211 is also provided for the user to indicate whether the user desires to print the first attachment in duplex.

A checkbox 208 is provided that is associated with the second attachment of the original email. The user desires to print that attachment and has checked checkbox 208. A checkbox 212 is provided for the user to enter the number of copies desired to be printed for the second attachment. A checkbox 214 is also provided for the user to indicate whether the user desires to print the second attachment in duplex.

A textbox 216 is provided that shows or allows a user to indicate which printer the user desires to print the selections of the user.

A button 218 is provided that allows the user to indicate that he or she wants to print what he or she has selected.

An Example Machine Overview

Figure 3:
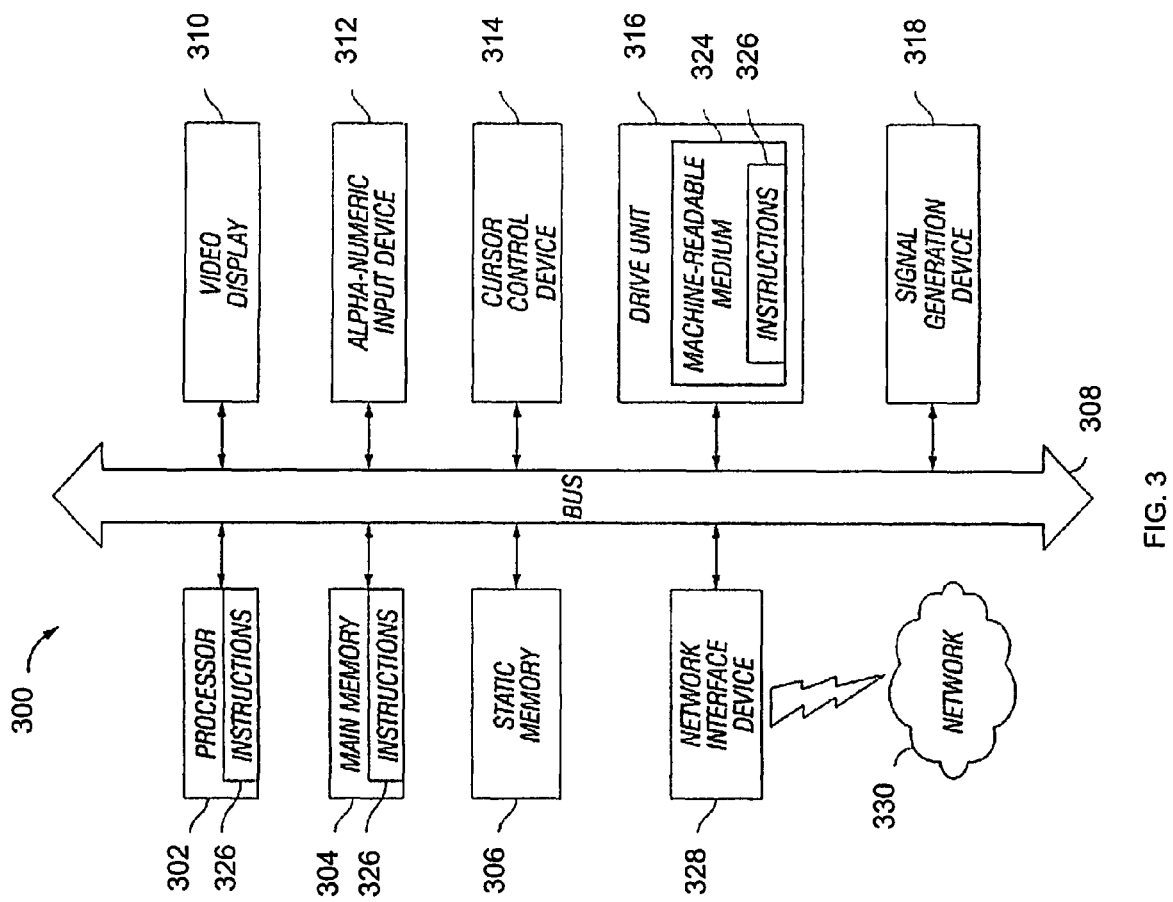
FIG. 3 is a block schematic diagram of a system in the exemplary form of a computer system according to an embodiment.

FIG. 3 is a block schematic diagram of a system in the exemplary form of a computer system 300 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 300 includes a processor 302, a main memory 304 and a static memory 306, which communicate with each other via a bus 308. The computer system 300 may further include a display unit 310, for example, a liquid crystal display (LCD) or a cathode ray tube (CRT). The computer system 300 also includes an alphanumeric input device 312, for example, a keyboard; a cursor control device 314, for example, a mouse; a disk drive unit 316, a signal generation device 318, for example, a speaker, and a network interface device 328.

The disk drive unit 316 includes a machine-readable medium 324 on which is stored a set of executable instructions, i.e. software, 326 embodying any one, or all, of the methodologies described herein below. The software 326 is also shown to reside, completely or at least partially, within the main memory 304 and/or within the processor 302. The software 326 may further be transmitted or received over a network 330 by means of a network interface device 328.

In contrast to the system 300 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for printing emails or items from a message service from a mobile device, comprising the steps of:
   receiving, at a server capable or enabled to manage or process printing, an item from a mobile device, the item having one or more attachments;
   responsive to receiving the item, generating a notification message that contains a link to a particular URL and sending the notification message to the mobile device;
   responsive to the link being activated, at the URL, dynamically generating an object, wherein the dynamically generated object is configured to allow selecting any of the one or more attachments and configured to allow selecting printing options associated with the one or more attachments; and
   responsive to receiving one or more selections of the one or more attachments and to receiving selected printing options associated with the one or more selections, sending the one or more selections of the one or more attachments and the selected printing options to a printing device;
   wherein one or more steps of are performed by one or more processors.

2. The method of claim 1, the notification message is a response email, the response email contains the link, and the response email is returned to an address from where the email arrived.

3. The method of claim 1, wherein the dynamically generated object comprises thumbnail images, wherein each thumbnail image is associated with one of said one or more attachments or a body of the item, itself.

4. The method of claim 3, wherein said each thumbnail image associated with said one or more attachments is a live hypertext link to a larger representation of said associated attachment.

5. The method of claim 4, wherein said each larger representation is a part of an image gallery with next and previous links.

6. The method of claim 3, wherein said dynamically generated object is an html page with multiple images comprising in part said thumbnail images.

7. The method of claim 1, wherein the dynamically generated object is presented on a browser at the mobile device.

8. The method of claim 1, wherein the printing options comprise any of: duplex, number of pages, media size, color, black and white.

9. The method of claim 1, further comprising:
   responsive to said receiving said one or more selections of the one or more attachments and to receiving selected printing options associated with the one or more selections, generating and returning a status of said selections.

10. The method of claim 1, wherein the item is an email.

11. An apparatus for printing emails or items from a message service from a mobile device, comprising the steps of:
   a server capable or enabled to manage or process printing configured to receive an item from a mobile device, the item having one or more attachments;
   a generating processor configured to generate, in response to the item being received, a notification message that contains a link to a particular URL and sending the notification message to the mobile device;
   a generating processor to dynamically generate, in response to the link being activated, an object at the particular URL, wherein the dynamically generated object is configured to allow selecting any of the one or more attachments and configured to allow selecting printing options associated with the one or more attachments; and
   a sending processor configured to send the one or more selections of the one or more attachments and the selected printing options to a printing device, in response to the one or more selections of the one or more attachments being received and to the selected printing options associated with the one or more selections being received;
   wherein at least one of the processors comprises a hardware implementation.

12. A method for printing emails or items from a message service from a mobile device, comprising the steps of:
   receiving, at a server capable or enabled to manage or process printing, an item from a mobile device, the item having one or more attachments;
   responsive to receiving the item, generating a notification message that contains a link to a particular URL and sending the notification message to the mobile device;
   responsive to receiving the item, generating an object at the particular URL, wherein the generated object is configured to allow selecting any of the one or more attachments and configured to allow selecting printing options associated with the one or more attachments; and
   responsive to receiving one or more selections of the one or more attachments and to receiving selected printing options associated with the one or more selections, sending the one or more selections of the one or more attachments and the selected printing options to a printing device;
   wherein one or more steps of are performed by one or more processors.

* * * * *